United States Patent Office 3,661,826
Patented May 9, 1972

3,661,826
WAX COMPOSITIONS COMPRISING PETROLEUM WAXES WITH CERTAIN HYDROGENATED TWO-BLOCK COPOLYMERS
Dale J. Meier, 6612 Lautrec Place, Palos Verdes Peninsula, Calif. 90274
No Drawing. Filed May 8, 1970, Ser. No. 35,942
Int. Cl. C08f 45/52
U.S. Cl. 260—28.5 B                 1 Claim

ABSTRACT OF THE DISCLOSURE

Wax compositions comprising hydrocarbon waxes with certain hydrogenated two-block copolymers have viscosities, tensile strength, hardness and adhesion substantially greater than that of the unmodified petroleum wax.

---

This invention is concerned with new wax-polymer compositions. More particularly it is directed to hydrocarbon waxes modified with certain hydrogenated block copolymers more fully described hereinafter.

The use of petroleum (and other hydrocarbon) waxes for the coating of paper or other substrates requires certain critical properties. These include flexibility, particularly at relatively low temperatures, and toughness under a wide variety of conditons. In order to minimize or prevent the waxes from flaking from the substrate and allowing cracks to appear in the wax article, coatings are particularly required having good low temperature properties especially where dairy cartons and the like are concerned. Moreover, freezer wraps are of even more demanding requirements relative to tendency to crack under the low temperature conditions encountered. On the other hand, the wax coatings must be of such a character that they do not block, i.e., stick together, at elevated temperatures as normally encountered during storage or under pressure such as may occur in the stacking of sheets of the wax-coated substrates or in the stacking of cartons awaiting filling or use.

Waxes have been modified by a great number of polymers in efforts to improve the compositions for the above and other uses. Many of the polymers, however, lack suitable properties and also have been found to be relatively incompatible with petroleum waxes and tend to form a separate phase therefrom when the compositions are in the melted state such as in a reservoir of a coating machine. Furthermore, even if some polymers are found to be compatible with wax, it is often difficult to incorporate the polymers in the wax in a uniform state. Furthermore, oxidative stability problems are encountered when the polymers contain aliphatic unsaturation. For certain use situations, as in carpet backing, it is necessary for the compositions to maintain their integrity even under conditions of shock, bending, sweeping, rolling, and other normal abuse to which carpets or other such substrates may be subjected during their utilization.

It is an object of the present invention to provide improved wax compositions. It is a further object of the invention to provide wax compositions modified by certain hydrogenated block copolymers. It is a particular object of the invention to provide wax compositions suitable for application to paper and other substrates. Other objects will become apparent during the following detailed description of the invention.

Now in accordance with the present invention, wax compositions having a variety of improved physical properties particularly relating to flexibility, toughness, and adhesion to either organic or metal substrates, comprise hydrocarbon waxes modified with 5–30% by weight based on the wax-polymer composition of certain two-block copolymers having one polymer block A which is either crystallizable or of reduced compatibility with wax, said block consisting of the group consisting of a non-elastomeric polymer block of a monovinyl arene, hydrogenated derivatives of such blocks, hydrogenated polybutadiene wherein the polybutadiene has less than about 20% 1,2 microstructure and alpha mono-olefin homopolymer blocks; the second block being an elastomeric block highly compatible with petroleum or synthetic hydrocarbon waxes, the group consisting of hydrogenated conjugated dienes and alpha mono-olefin copolymers. By "compatible" is meant the ability of a polymer of a specific type to form a single phase with a melted wax. By "less compatible" is meant the tendency of a polymer of a specific type to form a separate phase in a melted wax. A polymer block is said to be "crystallizable" if a heat of fusion can be detected by differential thermal analysis.

The present invention is based in part upon the discovery that the non-hydrogenated counterparts of the polymers of this invention are incompatible with waxes particularly in the melted state of the wax composition and therefore are prone to form a separate phase from the wax phase during the time that the melt may be in a reservoir feeding the composition to coating machines and the like.

In further accordance with this invention, it has been found that the wax-hydrogenated block copolymer compositions of this invention form an especially tight bond with paper or other fibrous products, and even with continuous films such as glassine and the like, as well as with metallic foils such as aluminum foil. In the latter instance, the use of the compositions of the invention as hot melt adhesives for the formation of laminates is especially contemplated. These laminates are useful not only as high strength wraps but also for the preparation of insulation boards or insulation bats and the like.

The hydrocarbon waxes particularly to be employed in the compositions of this invention are petroleum waxes having paraffins between about 20 and 60 carbon atoms per molecule as well as synthetic hydrocarbon waxes. The normal paraffin content is higher as the average molecular weight decreases. Petroleum waxes are obtained from waxy crude oil fractions, the relatively lower molecular weight paraffin waxes being obtained from distillate fractions, especially lube oils, while relatively high molecular weight paraffin waxes are separated from residual fractions such as bright stock fractions. The residual waxes include not only paraffin waxes but also microcrystalline waxes, the latter being complex mixtures of branched paraffins and cycloparaffin waxes with only small amounts of aromatics and substantially no straight chain paraffins. The following table shows typical waxes, relating melt points with molecular weights and concentration of normal paraffins in typical fractions containing them.

TABLE I

| Approximate melting point (° F.) | Approximate average molecular weight | Carbon atom range | Concentration of n-paraffins (percent v.) |
|---|---|---|---|
| 126 | 350 | $C_{20}-C_{32}$ | 92 |
| 140 | 420 | $C_{22}-C_{38}$ | 80 |
| 160 | 580 | $C_{24}-C_{45}$ | 54 |
| 182 | 650–750 | $C_{30}-C_{60}$ | 10 |
| 138 | 650–750 | $C_{28}-C_{60}$a | 12 | a Microcrystalline.

The above and other hydrocarbon waxes, as well as mixtures of such waxes, may be modified in accordance with the present invention by 2.5–30% (preferably 5–25%) by weight of the block polymer based on the combined weight of wax and polymer. The block copolymers described have two polymer blocks each of a different type. A first polymer block A may be described as non-elastomeric and is either less compatible with petroleum wax than the second type of block or is crystallizable. The blocks A may be selected from the group consisting of monovinyl arene polymer blocks such as polystyrene, hydrogenated derivatives thereof such as polyvinylcyclohexane, hydrogenated polybutadiene wherein the polybutadiene has less than about 20%, 1,2-microstructure and alpha mono-olefin homopolymer blocks such as polyethylene or polypropylene. If hydrogenated polybutadiene is employed, the blocks should be hydrogenated so as to remove at least about 90% of its original aliphatic unsaturation. The second block B can be described as an elastomeric block highly compatible with petroleum wax and selected from the group consisting of hydrogenated conjugated dienes and alpha mono-olefin copolymers. The dienes especially contemplated are butadiene and isoprene. If butadiene polymer blocks are used in blocks B, in order to be elastomeric they should have a 1,2-content prior to hydrogenation of at least 20% and preferably between 25–50% 1,2-microstructure. The alpha olefin copolymer blocks should be elastomeric and normally will comprise copolymers of ethylene with propylene, usually referred to as "EPR."

The conditions for hydrogenation of block copolymers are known and do not form a part of the present invention. One may synthesize a block polymer having the structure polystyrene-polyisoprene and thereafter selectively hydrogenate the aliphatic unsaturation to produce the block polymer polystyrene-hydrogenated polyisoprene. On the other hand, a suitable two-block polymer for use in the present invention comprises polybutadiene-polyisoprene wherein the polybutadiene block has a 1,2-microstructure less than about 20%. This may be completely hydrogenated to result in a block polymer resembling polyethylene-EPR. Microstructure may be controlled in the synthesis of dienes by the presence of a polar material such as an ether in addition to a lithium alkyl initiator, the polymerization being carried out in hydrocarbon solution. The higher the concentration of ether, the more 1,2-content will be found in the resulting polymer.

One advantage of the present invention lies in the possibility of synthesizing the block polymers in situ, i.e., in melted wax if so desired. Another advantage is that wax can be blended into a polymerization reaction mixture containing a relatively volatile inert solvent which may be removed if required prior to utilization of the wax-hydrogenated block polymer composition. On the other hand, the block copolymers can be separately prepared and hydrogenated and later added to the waxes. The block copolymers are normally synthesized by the use of such initiators as lithium alkyls or other organo lithium initiators. However, direct synthesis of saturated polymers when starting with alpha olefins may be preferred. In this case Ziegler type catalysts may be employed. Coupling may be employed if desired although this is not essential.

Another advantage is that wax can be blended into a polymerization reaction mixture containing a relatively volatile inert solvent which may be removed if required prior to utilization of the wax-hydrogenated block polymer composition. On the other hand, the block copolymers may be separately prepared and hydrogenated and later added to the waxes. The polymerization processes employed may be either sequential or involve coupling as referred to hereinbefore. The details of polymer synthesis do not form a part of the present invention. Sequential processes or the use of a mixed sequential and binary coupling process such as with a dihalohydrocarbon will result in the formation of linear block copolymers.

The molecular weights of the block copolymers is best described with respect to the individual blocks. While this will vary with the specific wax to be modified, and with the temperature of application of the wax polymer compositions, as well as with the monomer identity, the block molecular weights especially contemplated are as follows: it is preferred that the blocks B have average molecular weights between about 7,500 and 250,000 with blocks A having average molecular weights between about 5,000 and 50,000. Still more preferably, the blocks B are restricted to molecular weights averaging 10–150,000 while blocks A are restricted to molecular weights averaging 5–25,000.

The properties of these compositions indicate their particular utility for paper coatings, film coatings, laminating adhesives, and other applications of hot melt adhesive compositions as well as in wood impregnation. In the latter instance, wood is often impregnated with preservatives such as cresol and the like and wax is added to the cresol for the primary purpose of increasing penetration and reducing evaporation. The addition of the hydrogenation block copolymers within the limits described hereinbefore to the wax component causes a substantial reduction in evaporation of cresol and other volatiles from impregnated wood. The compositions may be modified by the presence of other polymers, particularly 3–20% by weight of saturated hydrocarbon resins such as resins derived from cracked petroleum fractions and resins of saturated terpene derivatives derived from wood rosin. Other examples are ethylene ethylacrylate and ethylene methylmethacrylate copolymers. They may be extended with rubber extending oils to form softer compositions if desired and may be employed in rug backing for the purpose of fiber locking and water proofing of other textiles.

The following examples illustrate the benefits of this invention:

EXAMPLE I

Compositions were prepared to determine the effect of the block polymer on wax properties. The wax employed was the following blend of petroleum waxes:

| Wax | Melting point, °F. | Weight ratio |
|---|---|---|
| Paraffin | 140 | 3 |
| Do | 160 | 1 |
| Do | 182 | 1.5 |
| Microcrystalline | 138 | 1.5 |

The block copolymer had the structure: Polystyrene-(hydrogenated polybutadiene, 45% 1,2-structure), the block molecular weights being 19,000–213,000. Table II gives the physical properties of the unmodified wax and of two wax-block copolymer blends.

TABLE II.—TOUGHENING OF WAX WITH 2-BLOCK POLYMER ALONE

| | Viscosity at 300° F. in centipoises | Tensile properties | | | M.I.T. flex test, number of flexes before break | Adhesion | |
|---|---|---|---|---|---|---|---|
| | | Yield point, p.s.i. | TB, p.s.i. | Elongation, percent | | Sulfite paper | Glassine, g./inch |
| Wax | 10 | | 150 | | 0 | No fiber tear | 0 |
| Wax plus 10% polymer | 6,480 | 440 | 260 | 20 | 100 | Fiber tear | 150 |
| Wax plus 20% polymer | 52,000 | 680 | 460 | 80 | 842 | do | 225 |

EXAMPLE II

The same wax blend was modified with a block copolymer and then further modified with a resin. The block copolymer had the structure polystyrene-(hydrogenated polybutadiene, 45% 1,2-structure), the block molecular weights being 23,000–100,000. Table III gives pertinent data of the wax in comparison with the blends.

TABLE III.—TOUGHENING OF WAX/BLOCK COPOLYMER COMPOSITION BY ADDITION OF RESIN

| | Viscosity at 300° F. in centipoises | M.I.T. Flex test, number of flexes before break |
|---|---|---|
| Wax | 10 | 0 |
| Wax plus 10% polymer | 5,875 | 8 |
| Wax plus 10% polymer plus 10% resin [1] | 8,000 | 36 |

[1] Pentaerythritol ester of hydrogenated rosin.

I claim as my invention:

1. A petroleum wax composition comprising
   (a) 2.5–30% by weight of a two-block copolymer having the structure polyvinylcyclohexane-hydrogenated polybutadiene wherein
      (1) the polyvinylcyclohexane block has an average molecular weight between 5,000 and 50,000,
      (2) the hydrogenated polybutadiene block has an average molecular weight between 7,500 and 250,000,
      (3) the polybutadiene block, prior to hydrogenation, has a 1,2-content of 20–50%, and
      (4) the polybutadiene block is substantially completely hydrogenated, and
   (b) 70–97.5% by weight of a hydrocarbon wax.

References Cited

UNITED STATES PATENTS

| | | | |
|---|---|---|---|
| 3,220,966 | 11/1965 | Flanagan | 260—28.5 A |
| 3,231,635 | 1/1966 | Holden | 260—28.5 B |
| 3,265,765 | 8/1966 | Holden | 260—876 B |
| 3,352,944 | 11/1967 | Wheat | 260—28.5 B |
| 3,354,239 | 11/1967 | Short | 260—876 B |
| 3,441,530 | 4/1969 | Bauer | 260—28.5 |
| 3,465,063 | 9/1969 | Hassell | 260—876 B |
| 3,485,894 | 12/1969 | Porter | 260—880 B |
| 3,496,125 | 2/1970 | Boyer | 260—876 B |

MORRIS LIEBMAN, Primary Examiner

P. R. MICHL, Assistant Examiner